(12) United States Patent
Kauling et al.

(10) Patent No.: US 8,067,749 B2
(45) Date of Patent: Nov. 29, 2011

(54) CLEANABLE HELICAL MODULES

(75) Inventors: Jörg Kauling, Köln (DE); Michael Jurgait, Rösrath (DE); Heinz Justen, Mechernich (DE); Sebastian Schmidt, Haan (DE)

(73) Assignee: Bayer Technology Services GmbH, Leverkusen (DE)

( * ) Notice: Subject to any disclaimer, the term of this patent is extended or adjusted under 35 U.S.C. 154(b) by 144 days.

(21) Appl. No.: 12/280,032

(22) PCT Filed: Feb. 8, 2007

(86) PCT No.: PCT/EP2007/001074
§ 371 (c)(1),
(2), (4) Date: Aug. 27, 2008

(87) PCT Pub. No.: WO2007/096057
PCT Pub. Date: Aug. 30, 2007

(65) Prior Publication Data
US 2008/0315117 A1  Dec. 25, 2008

(30) Foreign Application Priority Data

Feb. 20, 2006 (DE) .................. 10 2006 008 125

(51) Int. Cl.
*H01J 37/20* (2006.01)
(52) U.S. Cl. ............. 250/455.11; 250/428; 250/431; 250/432; 250/435; 250/436; 250/437; 250/492.1; 250/504 R
(58) Field of Classification Search ............. 250/428, 250/431, 432, 433, 435, 436, 437, 455.11, 250/492.1, 504 R
See application file for complete search history.

(56) References Cited

U.S. PATENT DOCUMENTS

| | | | | |
|---|---|---|---|---|
| 2,036,771 A * | 4/1936 | Pfistershammer | ............. | 52/298 |
| 2,636,991 A * | 4/1953 | Postell | ............. | 250/436 |
| 3,894,236 A * | 7/1975 | Hazelrigg | ............. | 250/435 |
| 4,101,777 A * | 7/1978 | Reid | ............. | 250/436 |
| 4,769,131 A * | 9/1988 | Noll et al. | ............. | 210/85 |
| 4,798,702 A * | 1/1989 | Tucker | ............. | 422/24 |
| 4,956,754 A * | 9/1990 | Chen | ............. | 362/101 |
| 7,420,183 B2 * | 9/2008 | Kaiser et al. | ............. | 250/437 |
| 7,578,933 B1 * | 8/2009 | Selman | ............. | 210/167.21 |
| 7,651,660 B2 * | 1/2010 | Kaiser et al. | ............. | 422/24 |
| 2002/0096648 A1 * | 7/2002 | Kaiser et al. | ............. | 250/492.1 |
| 2007/0181509 A1 * | 8/2007 | Araiza et al. | ............. | 210/748 |
| 2008/0224066 A1 * | 9/2008 | Nolen et al. | ............. | 250/436 |

FOREIGN PATENT DOCUMENTS

| | | |
|---|---|---|
| DE | 23 27 084 A1 | 12/1974 |
| DE | 43 04 444 A1 | 8/1994 |
| DE | 199 15 289 C1 | 7/2002 |
| EP | 0202820 | 11/1986 |
| EP | 1 464 342 A | 10/2004 |
| WO | 02 38191 A | 5/2002 |
| WO | 02 38502 A | 5/2002 |

OTHER PUBLICATIONS

VDI Heat Atlas 9th Edition 2002; Heat Transmission in the Flow Through Tube Helices; pp. 1-3.

* cited by examiner

*Primary Examiner* — Michael Maskell
(74) *Attorney, Agent, or Firm* — Norris McLaughlin & Marcus PA

(57) ABSTRACT

The invention relates to cleanable spiral modules and a method for production thereof.

11 Claims, 8 Drawing Sheets

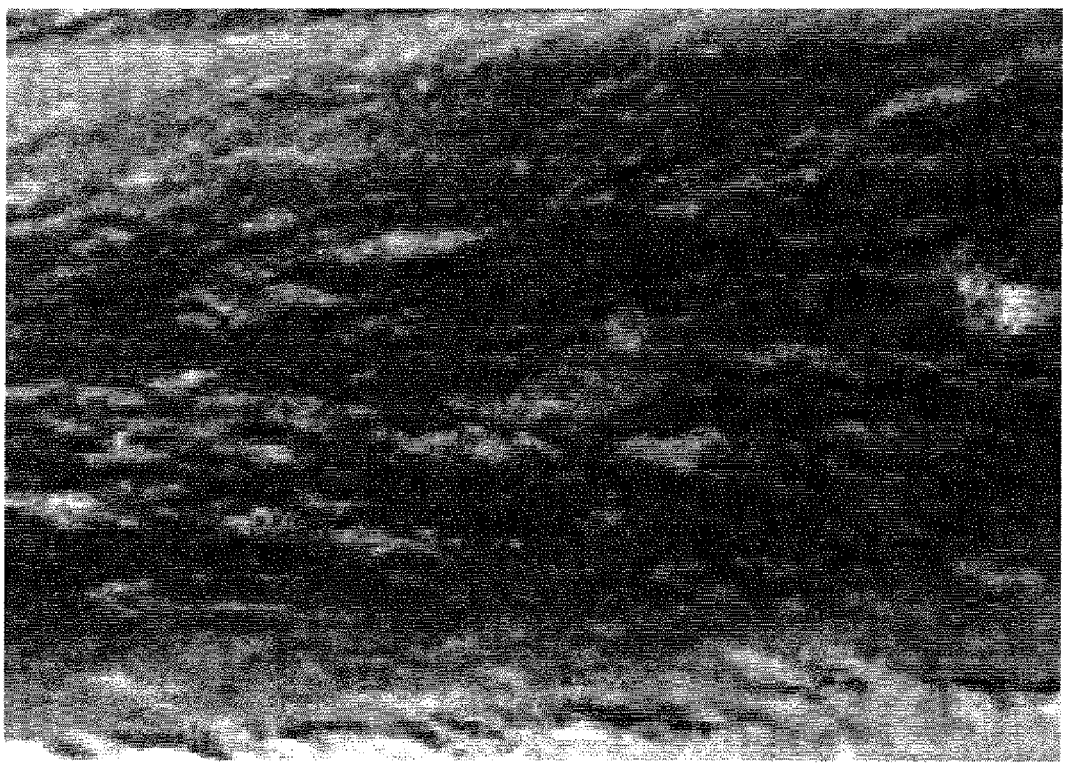
Fig. 8 Fouling on quartz glass surface

CLEANABLE HELICAL MODULES

This application is a 371 of PCT/EP2007/001074, filed Feb. 8, 2007, which claims foreign priority benefit under 35 U.S.C. §119 of the German Patent Application No. 10 2006 008.125.0 filed Feb. 20, 2006.

Cleanable helical modules and a method for their production form the object of the invention.

BACKGROUND OF THE INVENTION

The sterilization or germ reduction in liquid media in many processes is an important method step. Contamination with active, i.e. capable of reproduction, biological materials such as microorganisms or viruses often poses a risk to product safety which has to be countered effectively. There are also applications in which the contaminants themselves are the product and their inactivation is a desired product modification. Examples of such products are specific vaccines.

Germ reduction by inactivation using ultraviolet radiation, in particular with UV-C radiation and specifically at 254 nm has been known for a long time and has many practical applications. An example, in addition to surface sterilization, is also the treatment of liquid media such as drinking and waste water.

It is a considerable technical challenge if, besides the germs to be inactivated, materials of value are also present which, to a certain degree, can also be damaged by the radiation. Such requirements are typical for sterilization in the field of foodstuffs and of pharmaceutical active substances, such as proteins. Additional difficulties arise when the clouding of the processed liquid in the range of the UV-C radiation is high and thus the penetration depth of the inactivating radiation is low. Such applications require technical systems which can realize, despite the high clouding, a homogeneous irradiation, that is to say a dense dose distribution. In apparatuses through which fluids flow, a certain residence time, synonymous with irradiation time, should additionally be envisaged here. The system-specific residence time distribution here leads to a broad, i.e. inhomogeneous, dose distribution in the liquid.

In order to solve these problems, the prior art discloses various possibilities for transverse mixing in irradiated apparatuses through which fluid flows. The simplest solution, the production of a turbulent flow, may indeed result in a good transverse mixing, but is often difficult to realize in practice since the required high liquid speed together with the necessary irradiation time leads to impracticably long apparatuses. One solution in slow, laminar flow here envisages the fitting of mixing elements in the flow-guiding system [U.S. Pat. No. 6,190,608, EP Patent 0910417]. The internals (static mixers) are used to forcibly mix the laminar flow. Another solution makes do without internals: a helical flow-guiding system induces secondary flows which result in the desired transverse mixing. This flow-technological effect is known from the literature [VDI-Wärmeatlas (VDI Heat Atlas), Chapter Gc, Springer Verlag, Berlin Heidelberg 2002] and is described as the solution for said application [WO 02/38502, WO 02/38191, EP 1464342]. In a particularly preferred form, a tube with helical profile is applied in a form-fitting manner onto a quartz glass tube. This results in a module with a helical channel which can be irradiated from the inside by way of the quartz glass tube.

It is a disadvantage of the solutions according to the prior art that they can be cleaned only with difficulty. Cleaning the apparatuses, specifically the irradiation modules, is an important requirement for bulk products, for example in the foodstuff field where repeated use of the modules must be ensured for economic reasons. In the case of high-price products, such as pharmaceuticals, a lack of cleanability is countered by the concept of disposability in irradiation modules.

Cleaning can in principle take place by a cleaning liquid flowing through the entire apparatus or by mechanical or chemical cleaning of the parts after disassembly. The solutions with internals additionally have, because of them, an increased tendency to soiling and are therefore, from the viewpoint of cleanability, inferior to the helical tube modules according to the prior art. In the helical tube modules in which all components are connected in as form-fitting a manner as possible in order to enable optimum flow-guidance, disassembly and reassembly of the parts is not possible. According to the prior art, thus only cleaning by way of a cleaning liquid flowing through is possible. This is possible by its very nature not during but only after processing. In addition, the purely chemical cleaning is significantly less effective as compared to the mechanical or mechano-chemical cleaning, in particular when deposits form on the module walls. Chemical cleaning agents themselves are additionally mostly harmful for the subsequent applications. This results in a module having to be freed, after cleaning, from the cleaning agent, too, for example by flushing with water.

It was therefore an object of the invention to develop an irradiation module for the irradiation of fluids, which does not have the abovementioned disadvantages.

SUMMARY OF THE INVENTION

An object of the invention is therefore a cleanable helical module (irradiation module) for the irradiation of fluids, comprising a UV-transparent cover tube (2 or 2*a*), a radiation source (3) and a reactor housing (1 or 1*a*) mounted on the outside, with the result that a helical channel is formed, characterized in that the components can move with respect to each other, and a method for its production.

DETAILED DESCRIPTION

A helical module is generally characterized in that a helical component is mounted over an internal tube (2 or 2*a*) in a form-fitting manner. A radiation source (3) is located inside the tube (2 or 2*a*) and a helical channel, which forces a fluid, which flows through, into a helical flow and thus produces transverse mixing even in the case of laminar flows by way of secondary eddies, forms between tube (2 or 2*a*) and helix (1 or 1*a*).

The material of the tube which is used for the irradiation of the liquid should, to a large extent, be transparent to radiation. Suitable materials are, for example, glass or plastics. The material which forms the channel and through which no radiation passes should be particularly dimensionally stable. Suitable materials are, for example, metallic materials, plastics, ceramics, glass or composite materials. If this material is transparent at least to a large extent, a supplementary or alternative irradiation can also take place by way of this component.

In a preferred embodiment, all parts which the media come into contact with are produced from materials or coatings which are safe for foodstuffs.

In an embodiment for chemical applications, all materials which the media come into contact with are produced from materials or coatings which are inert with respect to the medium and known to the person skilled in the art.

Materials which are still flexible enough after shaping that pressing together by way of mechanical hydrostatic or pneumatic forces is possible are preferably used for the reactor housing.

In one embodiment, the module according to the invention is characterized in that it makes possible a relative movement of the individual components, in particular of the tube (2 or 2a) and the helix (1 or 1a), preferably by way of an internal rotor 8c which is connected to the cover tube (2 or 2a) and thus mechanical in-situ cleaning is carried out. The touching helical face of the helix can here be provided with a seal. This also enables material combinations which would otherwise not permit a form-fitting connection, such as a combination of quartz glass tube and metal helix. It is also possible to use tubes made of plastics which are transparent or partially transparent to radiation rather than the quartz glass tube. The inventive embodiment of the seal can prevent the surface from being scratched during a relative movement. Such scratching would destroy the important optical properties. The processed fluid itself can here also serve as lubricant without the irradiation being prevented thereby. A thin film ensuring sufficient irradiation forms in this case between quartz glass and seal. Ablated impurities and deposits are removed from the module by way of the rotating helical seal. The relative mobility due to the lubricated seal also enables a pulling off of the helix from the tube and separate cleaning of both components.

In another design according to the invention, the helix, specifically the sealing face of the helix, is designed with variable diameters. This makes it possible for the seal to be actively pressed against the tube. This can take place for example due to a pressure gradient. Applying a higher pressure to the outside of the helix than to the inside causes the seal to be pressed onto the tube. The pressure can also be applied to the fluid to be processed itself which is guided past the outside of the helix, i.e. the pressure side, before the entry into the gap between helix (1 or 1a) and tube (2 or 2a). In order to increase the pressure gradient, a screen may be provided before the entry into the gap, which screen increases the pressure drop. Differences in hydrodynamics in the external and internal regions additionally produce hydrodynamic pressure forces exerting a force on the seal. Alternatively, expandability is also possible if expandable polymer materials are used for the inner tube (2 or 2a). Applying a hydraulic or mechanical force can cause the inner tube (2 or 2a) to be pressed against the helix (1 or 1a).

The inside of the reactor housing is preferably electrochemically polished in order to reflect impinging beams as well as possible into the medium.

In another embodiment, an additional irradiation chamber for the fluid is formed on the outside of the helix (1 or 1a). If the helix is made from a transparent material, it is thus also possible to irradiate the pressure-side inlet. In an alternative or supplementary manner, it is also possible for the pressure-side inlet itself to be made of a transparent material, whereby additional irradiation from the outside is possible. In this manner, the irradiation intensity is increased.

Alternatively, the inside of the helix, both with and without sealing contact, can have a radiation-reflective design so that radiation which potentially escapes to the outside is reflected back into the fluid. This can be due to the use of reflective metallic or polymer materials or reflective coatings made of appropriate material. The reflection of the radiation at the rear wall can increase the light yield in the fluid up to a factor of two.

The cladding of the reactor housing (1 or 1a) is produced by way of a hydroforming method in one work step. Connection parts, bottom termination and flow-guidance geometries are connected to the cladding preferably without additional materials in a pressure-tight manner in a device using a laser welding process.

The sealing face of the reactor, which faces the cover tube, is preferably provided with a PTFE coating. This produces a low friction coefficient which enables simple manual removal of the cover tube and a low energy input for the rotational/stroke movement. Sealing the reactor housing with respect to the cover tube or with respect to the atmosphere preferably achieves sealings which are safe for foodstuffs and known to the person skilled in the art at the head ends (often integrated into the flanges).

In another embodiment, a cooling fluid can flow around the reactor housing. In this way, the process medium and the reactor housing can be kept within a permissible temperature range during the irradiation process. Absorbed radiation components in the process medium and housing are dissipated as heat energy by the cooling fluid.

In FIG. 2, the sealing of the reactor housing (1 or 1a) with respect to the cover tube is realized due to the pressure gradient from cooling fluid to the process medium or to the atmosphere. For the connections of process medium and cooling fluid, conventional couplings can be used.

Other design forms according to the invention provide for disassembly for cleaning the individual parts of the modules. Such a reversible separation in particular of cover tube (2 or 2a) and reactor housing (1 or 1a) can be made possible by way of various structures, thus, for example the reactor housing (1 or 1a) can be pulled off for the separate cleaning of the tube and slid over again after cleaning. If appropriate, the parts need to be phased for the purpose of easier assembly. In the design form with actively pressed-on seals, it is possible in the pressure-less state to remove and assemble again the helix with ease. In a third variant, both the tube and the helix are slightly conical. Conicity with an angle of smaller than 15°, specifically smaller than 5°, is preferred in this case. Due to this shape, tube (2a) and helix (1a) can be pushed into one another and be sealed by applying an inwardly directed axial force which pushes the parts further into one another. An outwardly directed axial force enables simple separation of the components for cleaning. If appropriate, a locking of the two parts may be provided for the assembled state, so that no continuous application of force becomes necessary.

In a preferred embodiment, for the purpose of simple disassembly and cleaning, the helical module is made up of only three individual parts, to be precise the reactor housing (1 or 1a), the UV-transparent cover tube (2 or 2a) and the UV radiator unit (3). These components can be disassembled quickly by way of clamping/screw connections and be cleaned mechanically or wet-chemically using simple means.

An additional possibility of cleaning is the physical introduction of a pig or of a helical insert which is pushed through the channel. This can be done mechanically, using compressed air or a fluid. On account of running through the helical channel, a mechanical cleaning effect ensues. This can also be enhanced by moving tube and helix with respect to each other when the insert is introduced and thus producing an additional relative movement also with respect to the insert.

The necessary forces for disassembly or the relative movement can be introduced both manually and non-manually. Non-manual possibilities are the force effect with a motor, preferably an electromagnetic motor, or a hydraulic or pneumatic system or a contactless electromagnetic drive. The movement can take place both continuously in one direction and alternately in opposite directions.

Such a helical module can be used in pharmaceuticals, biological products, antibodies, proteins, enzymes, vaccines, extracts, animal feed, foodstuffs (for example milk and milk products, juices, syrups, drinks), drinking and waste water, bulk or fine chemicals, photo-bioreactors. The aims are inactivation of germs, photosynthesis or photochemical reactions.

BRIEF DESCRIPTION OF THE DRAWINGS

Index of the Figures

FIG. 8: Fouling on quartz glass surface

INDIVIDUAL POSITIONING

Figure 1:
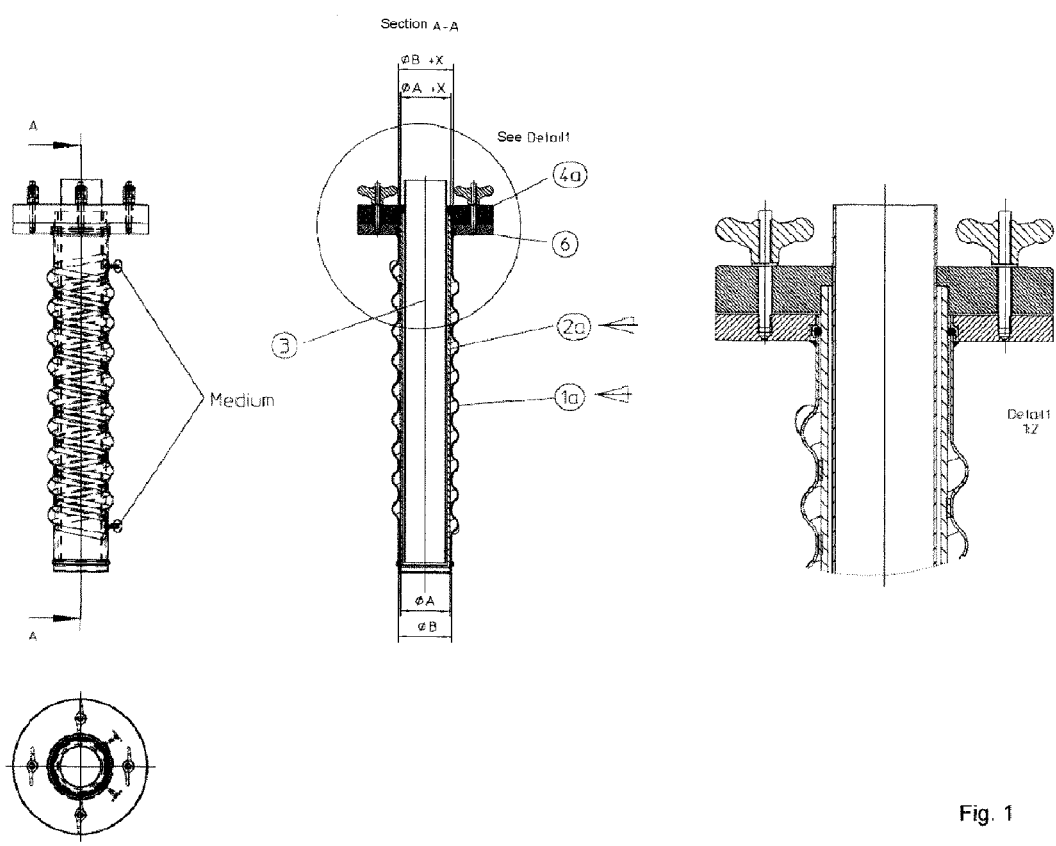
FIG. 1: Reactor housing as frustum
Figure 2:
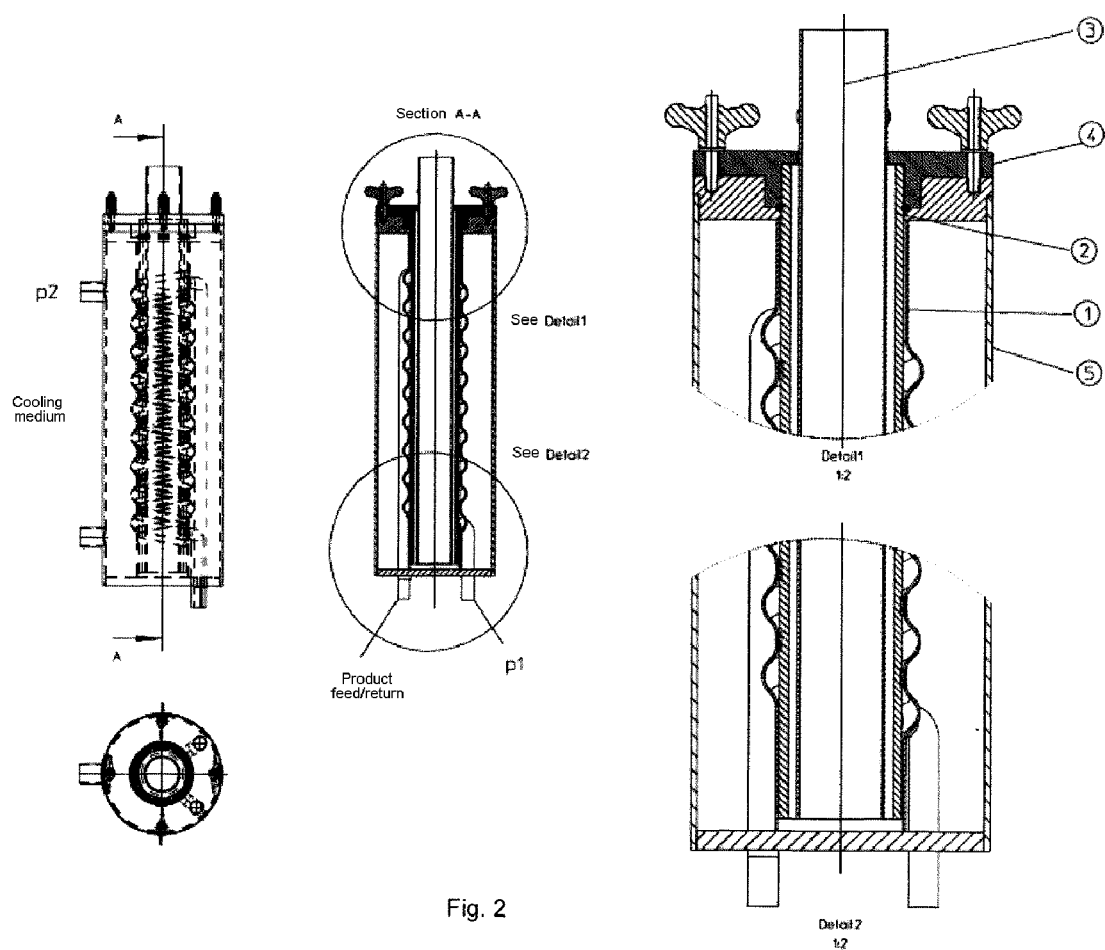
FIG. 2: Reactor housing with double cladding
Figure 3:
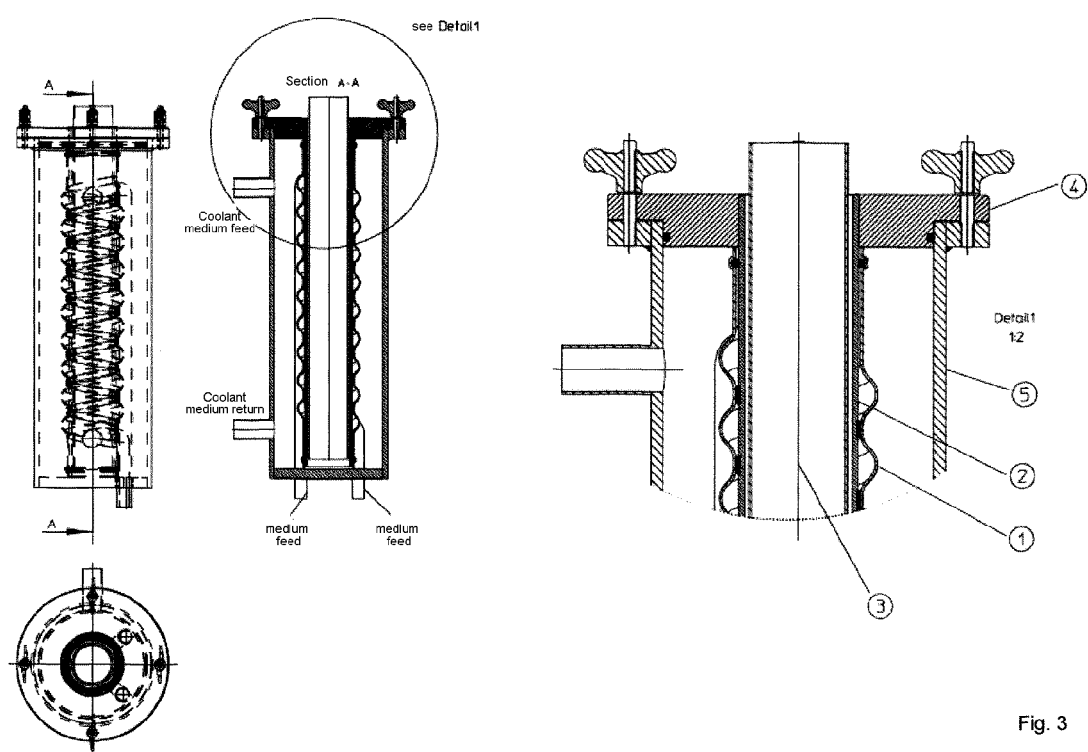
FIG. 3: Reactor housing with mechanical geometry adjustment
Figure 4:
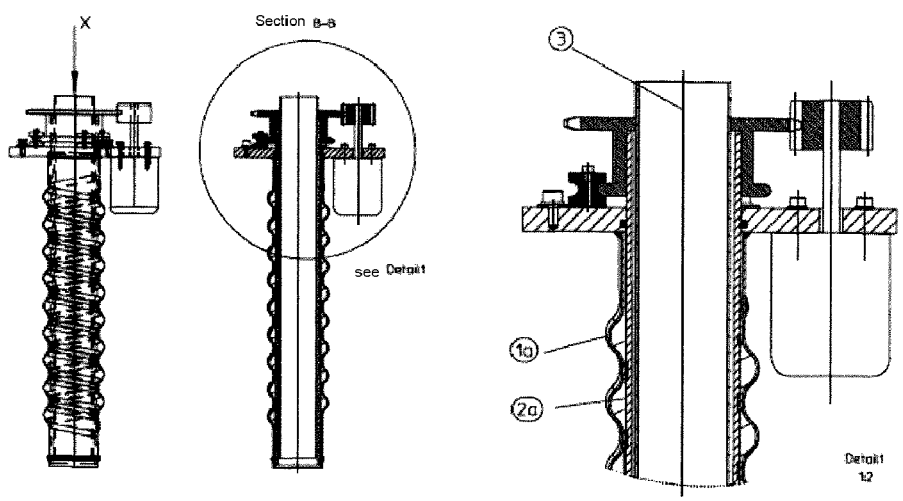
FIG. 4: Cover tube adjustment by way of an electromotor
Figure 4:
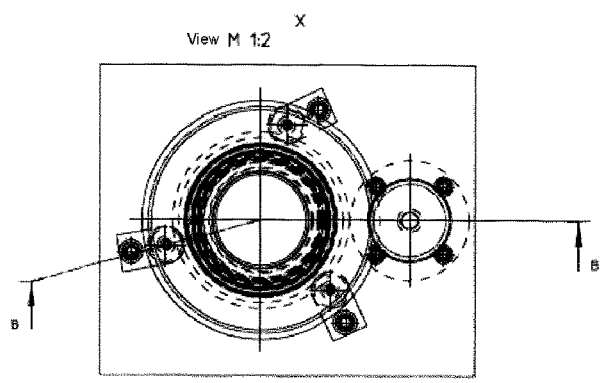
Figure 5:
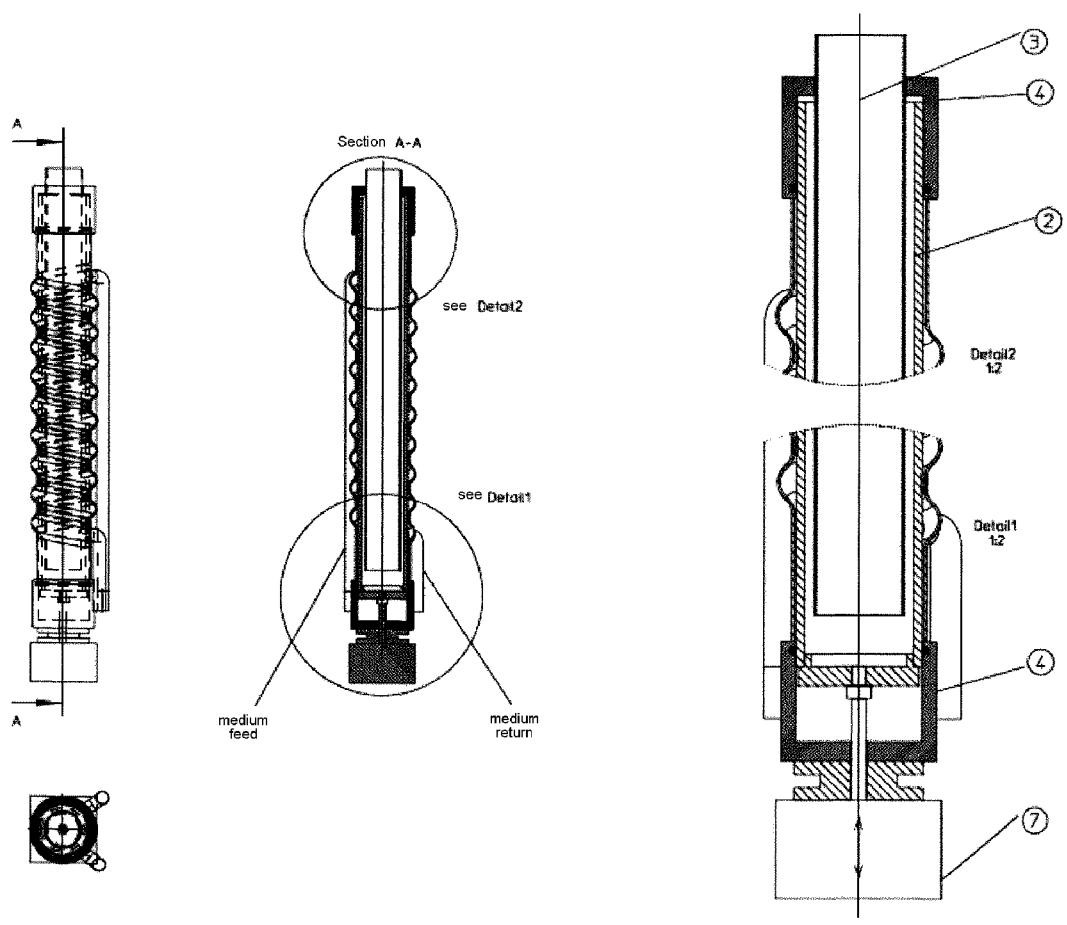
FIG. 5: Axial cover tube adjustment by way of lifting cylinder
Figure 6:
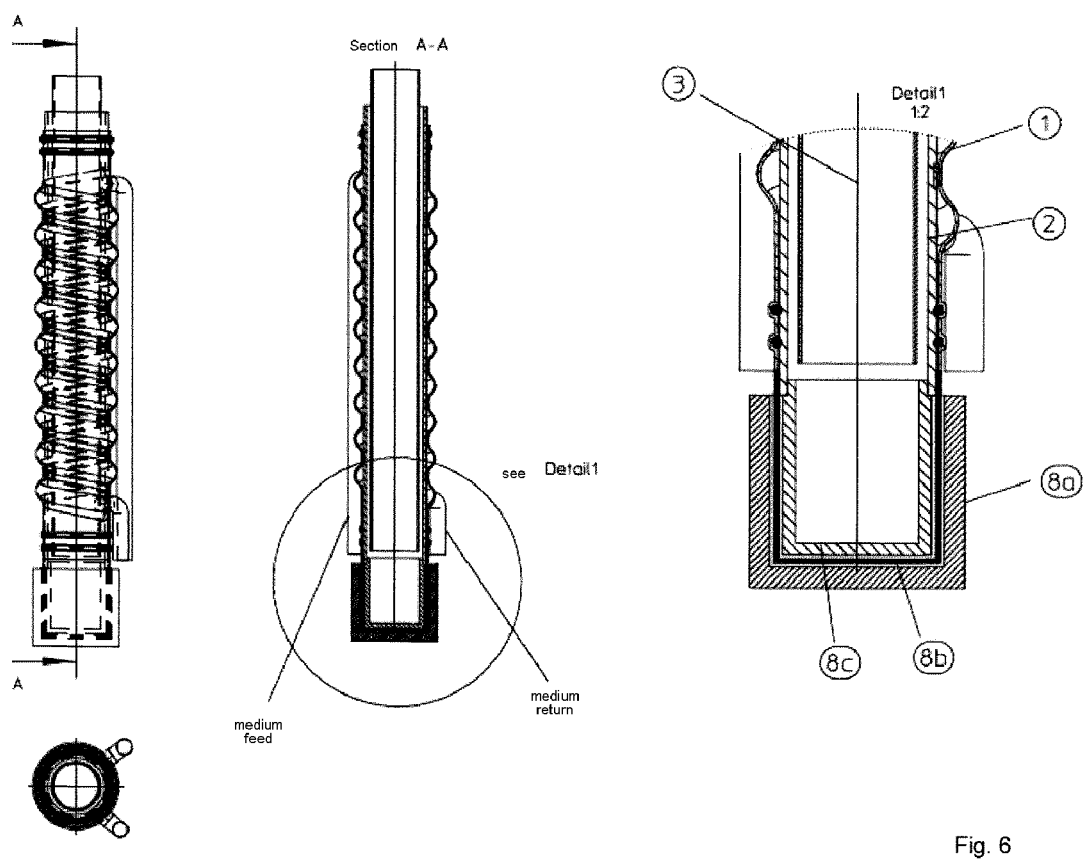
FIG. 6: Contactless electromagnetic cover tube adjustment
Figure 7:
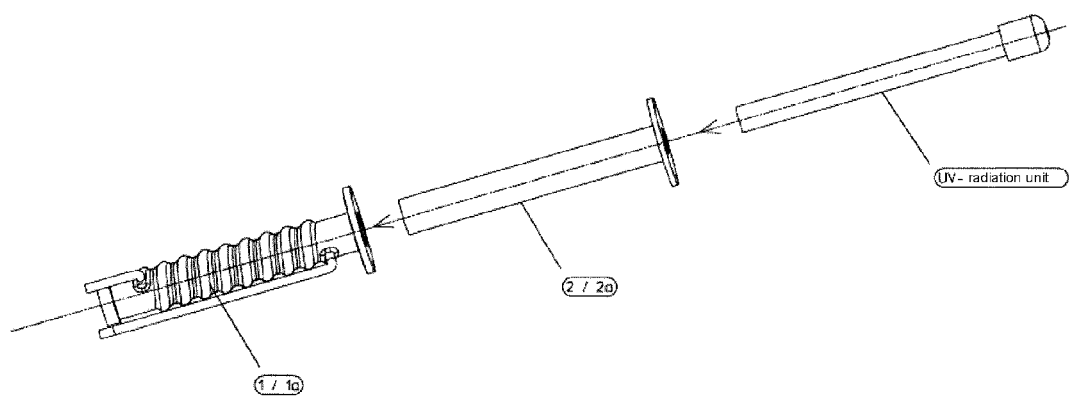
FIG. 7: Assembly/disassembly overview

Pos. 1 Cylindrical reactor housing
Pos. 1a Conical reactor housing
Pos. 2 Cylindrical, UV-transparent cover tube
Pos. 2a Conical, UV-transparent cover tube
Pos. 3 UV-radiator unit
Pos. 4 Cover tube flange, sealing
Pos. 4a Cover tube flange, non-sealing
Pos. 5 Secondary housing
Pos. 6 Secondary housing flange
Pos. 7 Lifting cylinder with plunger
Pos. 8a External ring of permanent magnet coupling
Pos. 8b Split case with reactor housing
Pos. 8c Internal rotor connected to cover tube

EXAMPLES

Example 1

Not According to the Invention

A solution was prepared from 0.5 l conventional milk with 1.5% fat content and *E. coli* phage of type MS2. The phage titer was more than $10^7$ phages/ml. The solution was guided in circulation mode at a volume rate of 10 l/h through a helical module with 24 ml of reaction volume. The module was made of a quartz glass tube, over which a helical Teflon hose was pulled. In this manner, a helical channel through which the liquid can be guided forms between quartz glass tube and Teflon hose. In the quartz glass tube, a 9 W low-pressure mercury lamp was located which irradiated the solution through the quartz glass with 35 W/m$^2$ at a wavelength of 254 nm.

After 30 min of irradiation, the test was stopped and a sample of the solution was mixed with *E. coli* host cells using a soft agar method and applied homogeneously on an agar plate. After one day, no plaques, i.e. no phage infectivity, could be found on the bacterial lawn. Accordingly, complete phage inactivation could be achieved by way of the irradiation.

The helical module was subjected to an optical test, wherein a clear deposit formation on the liquid-side quartz glass surface could be observed (cf. FIG. 8). The attempt to clean the surface by flushing with liquids such as water, soapy water, glass cleaning agent or NaOH failed.

At the same time, the helical module could not be disassembled without destruction and thus the surface could not be cleaned mechanically. Due to the formation of deposits, repeat use of the module is precluded since the UV radiation is screened off and can thus not reach the liquid.

Example 2

According to the Invention

An identical test was now carried out using a helical module of the invention with a quartz glass tube and a plastic helix which is not transparent to radiation and can be disassembled. The biological result of the complete inactivation of the phages was identical to the first test. Comparable deposits on the quartz glass surface were also present. The module according to the invention was disassembled and the quartz glass tube was thus separated. The quartz glass surface could now successfully be cleaned mechanically, using a conventional household sponge and glass cleaning agent. No damage to the surface could be observed.

In a control test, under identical conditions, complete inactivation of the phages was once again achieved.

The cleaned module could thus be successfully reused.

The invention claimed is:

1. A cleanable helical module for the irradiation of fluids, comprising a UV-transparent cover tube, a radiation source within said UV-transparent cover tube, a reactor housing movably mounted over said cover tube in a form-fitting manner and forming helical channels around said cover tube, said cover tube and said housing having conical shapes with angles of conicity of less than 15° whereby said housing and said cover tube are pressure fit against each other to seal said helical channels.

2. The module as claimed in claim 1, wherein said UV-transparent cover tube, radiation source and reactor housing are rotatable with respect to one another.

3. The module as claimed in claim 1, further comprising a sealing face which is in contact with the cover tube and reactor housing and is provided with a seal between cover tube and reactor housing.

4. The module as claimed in claim 1, configured to irradiate fluid passing through it without dead zones.

5. The module as claimed in claim 1, wherein said components are continuously movable relative to each other to effectuate an in-situ cleaning of the components.

6. The module as claimed in claim 1, wherein the UV-transparent cover tube and the reactor housing are sealable by pressing together.

7. The module as claimed in claim 1, wherein the reactor housing has an inside wall that reflects radiation.

8. The module as claimed in claim 1, further comprising an irradiation chamber on the outside of the reactor housing.

9. The module as claimed in claim 1, adapted for fluid flow from the outside of the reactor housing to the inside of the reactor housing and to produce a pressure gradient between outside and inside in the process.

10. The module as claimed in claim 1, wherein a cooling fluid flows around the reactor housing.

11. The module as claimed in claim 1 wherein the helix is provided with a seal on those parts of the helix which come into contact with the cover tube.

* * * * *